Aug. 29, 1939.  E. F. ZAPARKA  2,170,887
FLAP DEVICE
Original Filed June 1, 1933  4 Sheets-Sheet 1
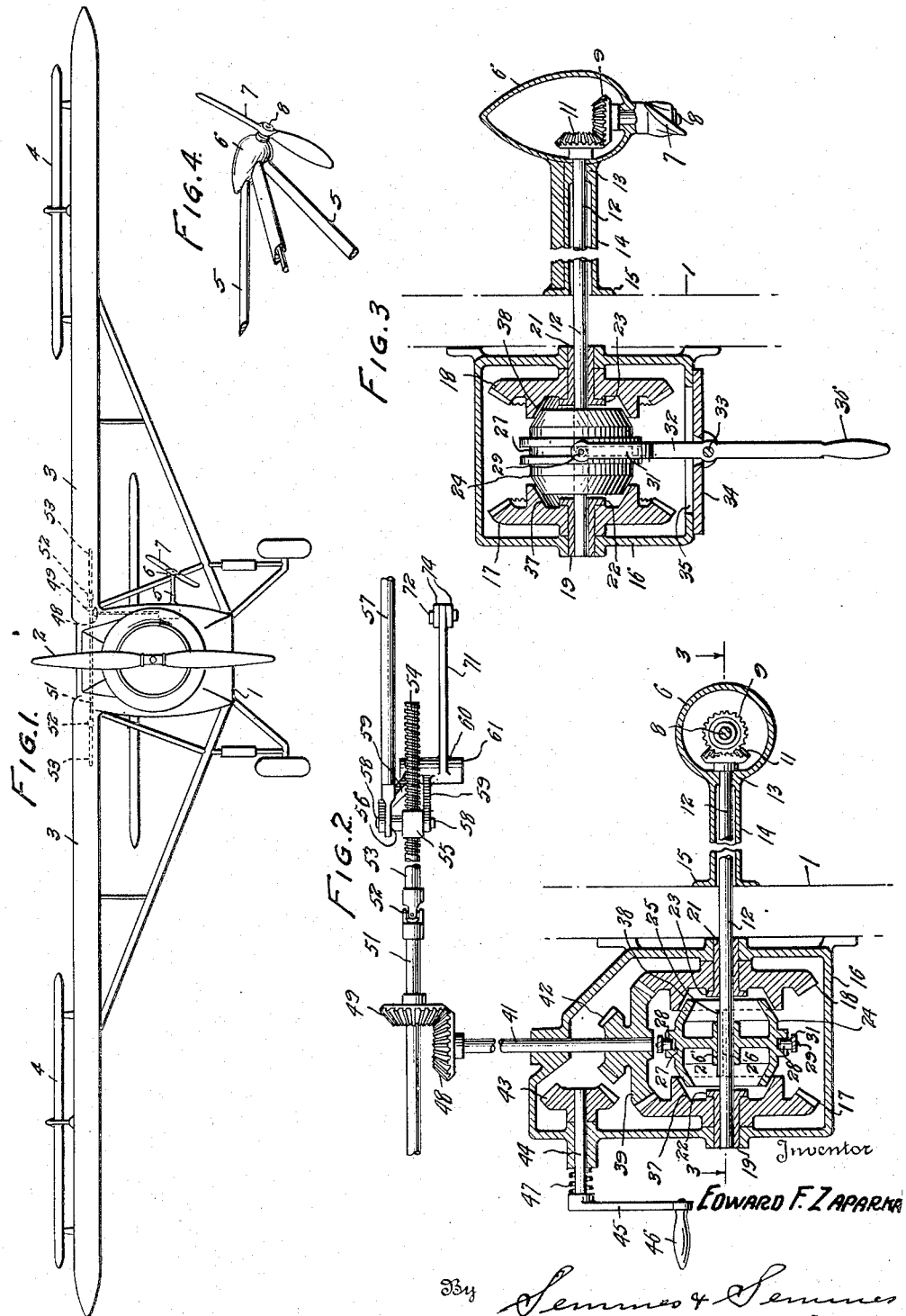
Inventor
EDWARD F. ZAPARKA
By Semmes & Semmes
Attorneys

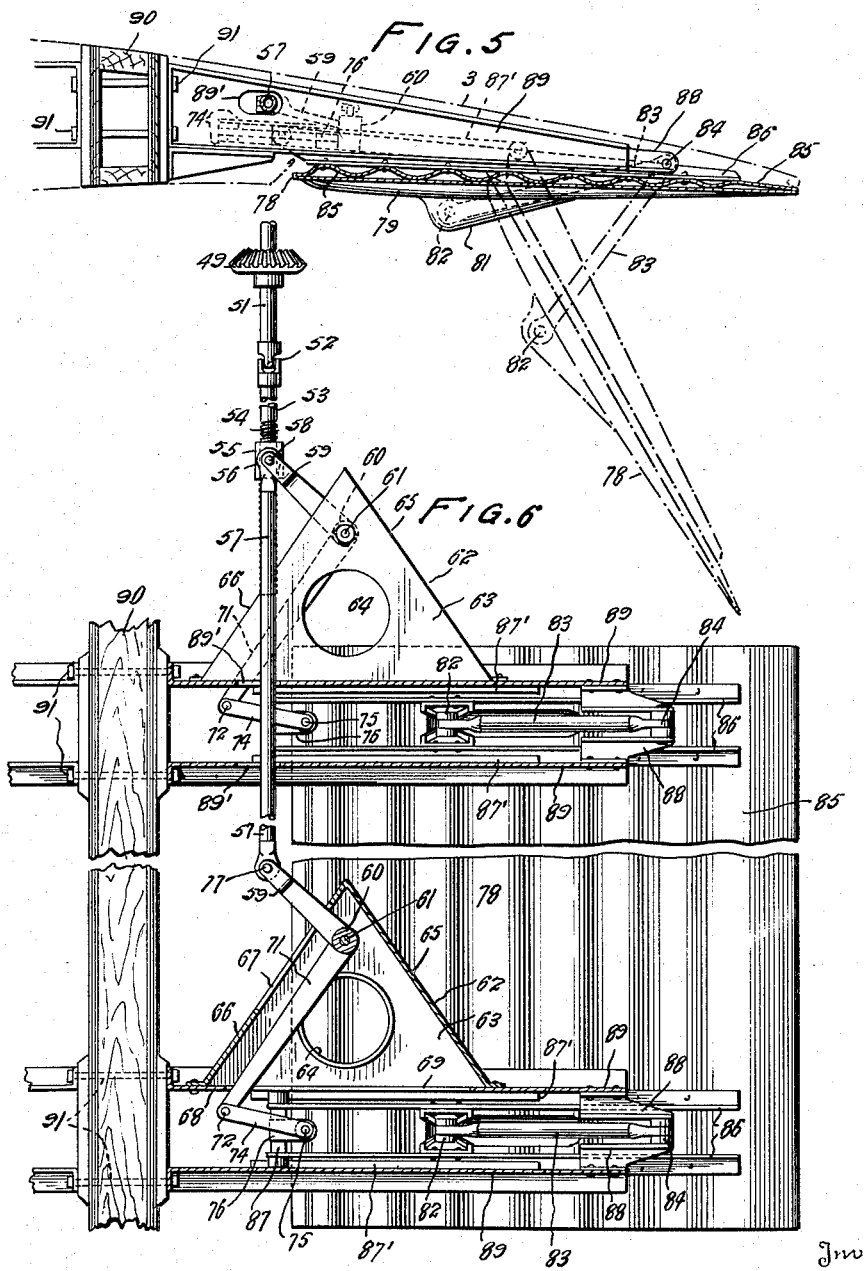

Aug. 29, 1939.  E. F. ZAPARKA  2,170,887
FLAP DEVICE
Original Filed June 1, 1933  4 Sheets-Sheet 3
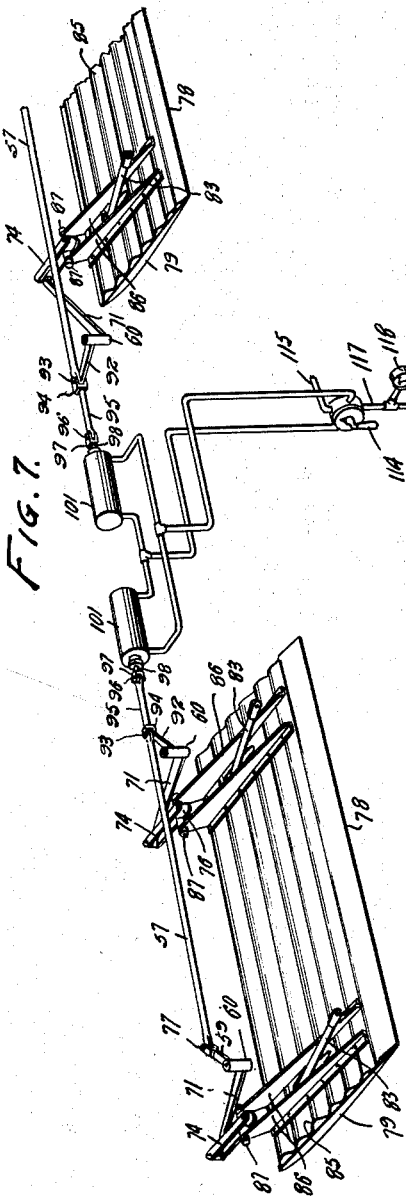
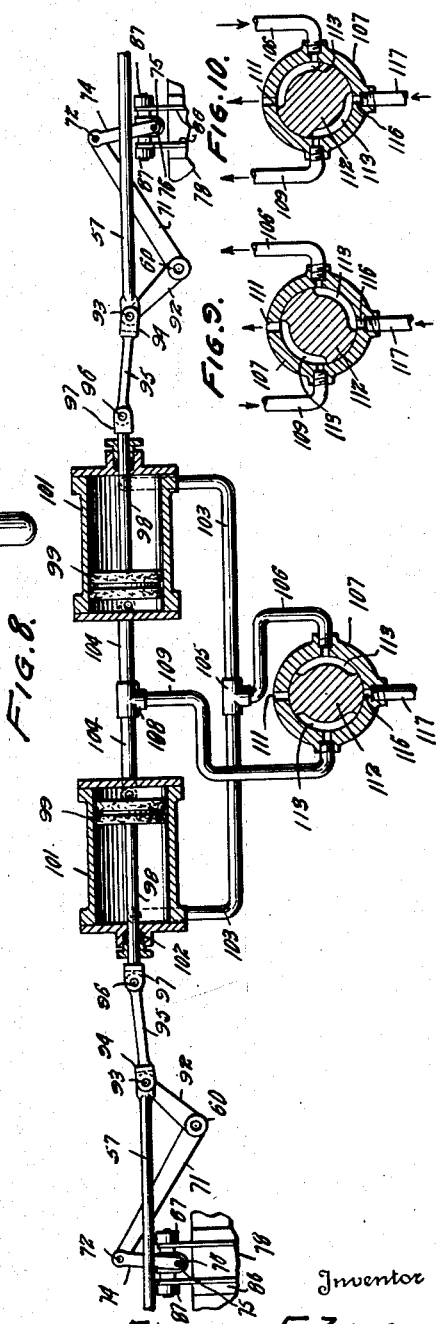
Inventor
EDWARD F. ZAPARKA
By Semmes & Semmes
Attorneys

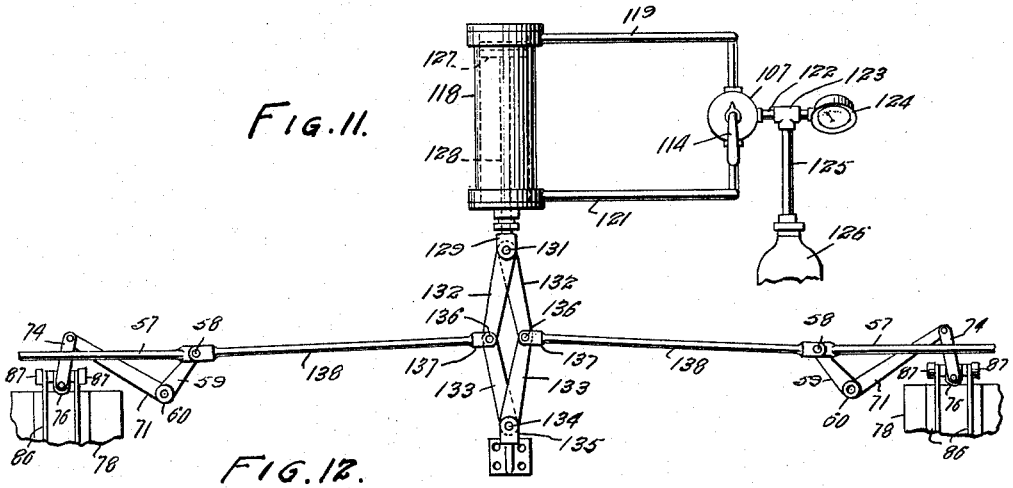

Patented Aug. 29, 1939

2,170,887

UNITED STATES PATENT OFFICE 2,170,887

FLAP DEVICE

Edward F. Zaparka, Coraopolis, Pa., assignor to Zap Development Corporation, Baltimore, Md., a corporation of Delaware Application June 1, 1933, Serial No. 673,911
Renewed October 13, 1936

6 Claims. (Cl. 244—42)

My invention relates to operating means for airfoils and more particularly to means for operating wing flaps of airplanes.

An object of my invention is to provide means for operating wing flaps in which the power is supplied by a source on the plane.

Another object of my invention is to provide means for operating wing flaps from a motor source whose power is derived from the flow past the plane.

A still further object is to provide manual means for operating wing flaps either to extend or retract them in combination with a motor deriving its source from the slip stream.

Yet a further object of my invention is to provide novel linkage and method of mounting the same for operating wing flaps.

Yet another object of the invention is to provide fluid or pneumatic means comprising a source of stored power under pressure and operating mechanism for extending and retracting wing flaps.

Where manual means for extending and retracting wing flaps alone were employed in the past it often took considerable time to extend and retract the flaps, and the utility therefor was somewhat limited, as quick retraction or extension of the wing flaps often is necessary to meet emergency conditions. Moreover, where large airplanes are used, manual means are of necessity very slow since the mechanism required to move large airfoils in the flow must be great. It is to overcome the difficulties of the prior art that these invention were conceived.

In the drawings:

Figure 1 is a front elevation of an airplane having a propeller motor mounted in the flow.

Fig. 2 is a detail view partly in section of the gearing and linkage for operating the wing flaps from the propeller motor.

Fig. 3 is a sectional view taken along the line 3—3 of Fig. 2 looking in the direction of the arrows.

Fig. 4 is a perspective view in detail of the propeller motor and its mounting.

Fig. 5 is a detail view in section showing the wing flap and operating mechanism, parts being shown in dotted lines to indicate the open position of the flap and the position of the operating mechanism.

Fig. 6 is a detail top plan view of the operating mechanism for the wing flaps, parts being broken away to shorten the drawing.

Fig. 7 is a diagrammatic view in perspective of a flap operating system employing compressed gas or a fluid.

Fig. 8 is a detail top plan view of a portion of the mechanism shown in Fig. 7, the valve and cylinders being shown in section to more clearly indicate the functioning of the parts.

Fig. 9 is a sectional view in detail of one position of the operating valve of Fig. 8.

Fig. 10 is a section view in detail of another operative position of the valve of Fig. 8.

Fig. 11 is a partly diagrammatic view showing another modification of a system employing stored gas for operating the wing flaps or a stored fluid.

Fig. 12 is a view in side elevation showing a compression arrangement employing a hand pump.

Fig. 13 is a top plan view partly diagrammatic showing another system for operating the wing flaps, part of the cylinder being broken away to indicate the position of the pistons.

Referring to the drawings, I have shown an airplane having a fuselage 1, propeller 2 and wings 3. On the wings I mount ailerons 4 of a type which is original with me and which are covered in copending applications. The operating mechanism for the various controls is neither shown nor described as it is not thought necessary to a clear understanding of the present invention. On the fuselage 1 are mounted streamlined support members 5 which carry a streamlined gear box 6. On the front of the gear box 6 is mounted a propeller 7.

The propeller 7 is attached to a shaft 8 which carries a conical pinion 9 which meshes with another conical pinion 11 mounted on the end of a shaft 12. The shaft 12 is journaled in the side of the gear box 6 and 13. The shaft 12 passes through a streamlined housing 14 which is mounted at 15 on the outside of the fuselage 1.

On the other or inner side of the fuselage 1 is mounted a gear box 16. Mounted to loosely turn on the shaft 12 and in the gear box 16 are conical gears 17 and 18. Gears 17 and 18 are mounted, respectively, on bushings 19 and 21, which are provided, respectively, with flanges 22 and 23. The flange 22 on the bushing 19 holds the gear 17 in contact with the side of the gear box 16 but permits the gear 17 to idle on the shaft 12. Likewise the flange 23 holds the gear 18 positioned in contact with the side of the gear box 16 but permits the gear 18 to idle on the shaft 12.

Means are provided that lock either the gear 17 or gear 18 as desired, so that it must rotate with the shaft 12. This means I have shown as a double cone clutch 24 which is splined to the shaft 12 through a key 25 which jets in a keyway indicated in dotted lines at 26 in Fig. 2 of the drawings. The key 25 slides in a keyway joined on the outer portion 26' of the double cone clutch member 24. The double cone clutch 24 is provided with a trough 27 in which are adapted to travel rollers 28 mounted on shafts 29, which are mounted on forked arms 31 of clutch shift lever 32, which is pivoted at 33 in a plate 34 that fits over an aperture 35 in the gear box 16.

The lever 32 is provided with a handle 36 so that by moving the handle in either direction the double cone clutch member 24 can be shifted along the shaft 12 to cause one of its clutch faces to engage either a clutch face 37 formed on bevel gear 17 or a clutch face 38 formed on bevel gear 18. When the lever 32 is moved to cause the clutch face on the double cone clutch 24 to engage with the clutch face 37, gear 17 is caused to turn with the shaft 12, since the shaft 12 is keyed to the double cone clutch 24. In this case bevel gear 18 can idle.

Both bevel gears 17 and 18 mesh with a bevel gear 39 which is mounted on a shaft 41 journaled in the housing 16. When the bevel gear 17 is keyed to the shaft 12 bevel gear 39 is caused to rotate in one direction, the bevel gear 18 idling. When the double cone clutch is shifted in the opposite direction by the handle 36, bevel gear 18 is keyed to the shaft 12 and rotates bevel gear 39 in the opposite direction for the same rotation of the shaft 12, the bevel gear 17 then idling.

Bevel gear 39 is formed with a small bevel gear 42 which is adapted in emergency, or when the ship is on the ground, to be caused to mesh with a bevel gear 43 mounted on a shaft 44 which is journaled in the side of the housing 16. The shaft 44 is adapted to be rotated by means of a crank 45 provided with a handle 46. A spring 47 normally prevents bevel gear 43 from meshing with bevel gear 42. In an emergency, or when the airplane is on the ground, shaft 44 can be pushed inwardly against the tension of spring 47 and gears 43 and 42 can be brought into mesh so that the shaft 41 may be rotated in either desired direction to extend the wing flaps or to retract them.

Shaft 41 carries at its end opposite the gear 42 a bevel gear 48 which is adapted to mesh with a bevel gear 49 on a shaft 51 which may be suitably journaled in the airplane construction.

The shaft 51 is provided with gimbal joints 52 which permit transmission of torque and also permit free movement in all planes. The gimbal joints 52 carry shafts 53 which are provided with screw threaded sections 54.

In screw threaded engagement with the portions 54 of the shafts 53 are operating heads 55 to which are pivoted at 56 operating rods 57, which are adapted to operate remote stations in the wings for effecting the movement of the flaps. The operating heads 55 carry pivots 58 to which are pivoted forked arms 59 of bell crank levers 60, which are pivoted at the angle of the bell crank arms 61 to pins which are anchored in a triangular box-like support construction 62, which has triangular sides 63 with holes 64 cut away in them to lighten the construction. The triangular box-like members are provided with three side pieces. One side piece 65 has no aperture in it. Another side piece 66 is provided with an aperture or slot 67, and another side piece 68 is provided with another slot or aperture 69. The bell crank levers 60 have other arms 71 which carry pivot pins 72 at their ends, over which fit links 74. The other end of the links 74 are pivoted at 75 to connecting members 76 which are attached to the flap construction.

The linkages described are the same for various flap operating stations on the wings. The stations most adjacent to the gimbal joints 52 have the arms 59 of the bell crank levers 60 attached directly to the operating heads 55 which are on the screw threaded portions 54 of the shafts 53. The stations most remote from the gimbal joints 52 have the arms 59 of the bell crank levers 60 pivoted at 77 to the end of the operating links 57, the link ends thus constituting the operating heads for these remote stations.

Depending upon which direction the handle 36 is moved when the airplane is flying through the air, the power of the propeller 7 is transmitted through the mechanism described to rotate the shaft 51 in either direction. This rotation is transmitted to the shafts 53 beyond the gimbal joints 52 and through the linkages described the links 74 are thrust either towards the rear of the wing or pulled towards the front of the wing. When the links 74 are thrust to the rear of the wings the flaps are extended. When they are pulled towards the leading edge of the wings the flaps are retracted.

The wing flap constructions have been described in some detail in previously filed applications. The wing flaps themselves I have designated by the numeral 78. The flaps comprise a lower smooth outer surface 79 having downwardly extending housing portions 81 in which are pivoted at 82 links 83 whose other ends are pivoted at 84 in the wing construction. There are provided corrugated metallic bracing members 85 having channel members 86 on their upper surface. The links 76 are pivoted to pivot pieces 87 which slide in tracks 87' on the support members. The pivots 84 for the links 83 are attached to support pieces 88 carried on the ends of support members 89 which are attached to the rear wing spar 90 by means of bolts 91. The rods 57 pass through apertures 59' joined in the support member 89 at the stations nearest the fuselage. Pins 87 are attached to channel members 86 carried by the flaps.

When the links 74 are pushed to the rear they pull on links 76 and these, through pins 87, move the flaps downward into the position shown in dotted lines in Fig. 5. When the movement of the links 74 is in the opposite direction, the flaps are moved into the position shown in full lines in Fig. 5. These flaps may be of the type wherein the dimensions of the flap, length of linkages and other factors are such as to cause the trailing edge of the flap to lie in positions of extension and retraction within the locus of perpendiculars drawn through the trailing edge of the wings and perpendicular to the datum lines of the wing sections. It is to be understood, however, that I am not limited to this particular type of flap in connection with the use of the operative mechanisms and systems which are described in this application.

Referring to Figs. 7, 8, 9 and 10, I have shown a system for the operation of the wing flaps which comprises a similar operating linkage arrangement for the flaps. Each of the flap stations has a bell crank lever 60. Each bell crank lever 60 at the stations near the fuselage is provided with an arm 92, corresponding to arms 59 of the previously described forms, which is pivoted at 93 in fork supports 94 carried by rods 95, which are in turn pivoted at 96 in fork supports 97 carried by piston rods 98. The other arms and the supports for these bell crank levers, and the operating links 74 are similar to those described in connection with Figs. 5 and 6. Similar operating mechanisms are shown for the stations more remote from the fuselage. Here the bell crank levers 60 are constructed as in the forms shown in Fig. 6. The arms 59 of these levers are pivoted at 77 to the rods 57. The ends of the rods 57 adjacent the rods 95 are pivoted in fork supports 94.

Attached to the piston rods 98 are piston heads 99 of the usual construction. These piston heads 99 are adapted to travel in cylinders 101. The piston rods 98 slide through one end of the cylinders 101 through suitable and usual packing glands 102. Pipes 103 communicate with one end of the cylinders 101 and pipes 104 communicate with the other end of cylinders 101. The pipes 103 meet in a T-joint 105 which communicates with the pipe 106 which leads into a valve structure 107.

The pipes 104 are connected by a T connection 108 with a pipe 109, which also is connected to the valve 107. The valve 107 is of the usual type and is provided with an exhaust port 111 and a movable valve member 112. The movable valve member 112 is provided with cutaway portions 113. The movable portion 112 is adapted to be rotated by a handle 114. The exhaust port 111 communicates from an exhaust pipe 115 which leads to some suitable spot to discharge exhaust gases.

The valve 107 is provided with an inlet port 116 with which communicates inlet line 117. The inlet line 117 is provided with a pressure gauge 118 and communicates with a source of stored gas under pressure 119 or of other stored fluid under pressure.

In the position of the parts shown in Fig. 8, the exhaust port 111 is closed and the inlet port 116 is closed. In this position the flaps will be maintained in the position which they occupy; i. e., the up position. This position is shown in Fig. 8.

Let us assume that the rotatable member 112 of the valve is moved by the handle 114 to the position shown in Fig. 9. Here pipe 109 is thrown into communication with exhaust port 111, therefore, the gas can exhaust in advance of the pistons 99. At the same time it will be noted that inlet port 116 is in communication with pipe 106 which admits pressure to the cylinders to drive the parts into the position shown in Fig. 8.

Let us assume that the rotatable member 112 of the valve 107 is moved in the position shown in Fig. 10. Here exhaust port 111 is thrown into communication with pipe 106 which permits the escape of fluid from the side of the cylinders communicating with pipe 106 and also the side of the cylinders with which pipes 103 communicate. At the same time inlet port 116 is thrown into communication with pipe 109, admitting gas under pressure from the storage vessel 119 into pipes 104 which admit the compressed gas into the cylinders. The gas presses on the piston heads 99 and moves them to the opposite end of the cylinder from that shown in Fig. 8. Obviously by manipulation of the handle the valve may be barely cracked, the operation of the flaps may be stopped at any desired point in travel, and extended or retracted. By proper manipulation of the valve 114 the action may be fast or slow, and the flaps may be stopped at any desired point. The position of the rotatable member 112 of the valve, as shown in Fig. 8, stops movement of the pistons 99, which will tend to stay in any desired position which the pistons 99 may occupy at the time the valve parts are moved to the position shown in Fig. 8. The action, of course, of the airstream against the flaps may create forces which will tend to move pistons 99 slightly, but such movement will not be large or objectionable.

In Fig. 11 I have shown a single cylinder 118 with which communicates pipe 119 at its upper end and pipe 121 at its lower end. Pipe 119 and pipe 121 communicate with the valve 107 of the type previously described. The valve 107 has the usual inlet pipe 122 and an exhaust or outlet (not shown in the drawings). The inlet pipe 122 communicates with a T fitting 123 which carries pressure gauge 124. The T fitting communicates through pipe 125 with a source of gas under pressure 126. By manipulation of the valve 107 by means of the handle 114 the piston 127, shown in dotted lines, may be moved from one end of the cylinder 118 to the other to move the piston rod 128. Piston rod 128 is provided with a bifurcated end 129 and a pivot pin 131. Attached to the pivot pin 131 are two toggle links 132.

Two other toggle links 133 are pivoted at 134 to a fitting 135 which may be suitably bolted or otherwise attached to some convenient portion of the structure of the airplane. Toggle links 132 and 133 are pivoted at their other ends to pivot ends 136 which are carried in bifurcated sections 137 of rods 138. The rods 138 correspond to rods 95 of the form of invention shown in Figs. 7 and 8 and the remaining bell crank and other linkages to the flaps are similar to those there shown.

By suitable manipulation of the valve handle 114, as in the form of invention just described in connection with Figs. 7 to 10, inclusive, the piston 127 may be caused to move from one end to the other of cylinder 118, and through the double toggle arrangement just described rods 138, corresponding to rods 95 of the form of invention shown in Figs. 7 to 10, inclusive, may be reciprocated to open or close the flaps.

In Figs. 12 and 13 I have shown somewhat diagrammatically a hand pump arrangement for compressing the gas, such as air, which may be used in any of the forms to move the piston heads in the cylinders. In the form of device shown in Fig. 12 I have indicated a storage reservoir 139 for gas under pressure and a hand pump 141 which is pivoted at 142 to a support member 143 carried above the tank 139.

The tank 139 is provided with pressure gauge 144. The lower end of the lever 141 is pivotally attached at 145 by suitable connections to piston rods 146 which, through movement of the handle of the lever 141, may be caused to reciprocate and thus cause piston heads, not shown, in cylinders 147 to pump air through pipes 148 into the storage tank or reservoir 139.

The storage tank or reservoir 139 is provided with an outlet 149 which communicates with a pipe 151. Pipe 151 communicates at the outlet of the valve 109 which is provided with operating handle 114. From the valve pass air pressure pipes 152 and 153. The valve 107 is provided with an exhaust outlet (not shown). Pipes 152 communicate with two pipes 154 which communicate with opposite ends of the cylinder 155. The pipe 153 communicates with the approximate center of the cylinder 155. In the cylinder 155 are adapted to reciprocate opposed piston heads 156 which are attached to piston rods 157 that pass through suitable packing glands 158 provided in the ends of the cylinder 155. The piston rods 157 are connected as in the form shown in Figs. 7 to 10, inclusive, and have a bifurcated fitting, such as the fitting 97, as clearly indicated in Figs. 7 and 8. The remaining linkages to the flaps themselves are similar to that shown in Figs. 7 and 8.

In operation by manipulation of the handle 114 the valve 107 may be operated to admit air through pipe 153 and exhaust air through pipes 154 to thus shove the piston heads 156 to opposite ends of the cylinder 155. Likewise by admitting air under pressure through pipe 154 and exhausting air from the center of the cylinder through pipe 153 the opposed pistons may be caused to approach each other towards the longitudinal center of the cylinder 155. Thus the flaps may be moved to desired positions and either extended or retracted.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

Although I have spoken of gas under pressure and air particularly as the source of power, it is to be understood that any fluid such as oil or other similar medium may be employed under pressure to effect the movements of the pistons and the consequent operation of the flaps.

I claim:

1. A flap operating mechanism for increasing the lift coefficient of the wings comprising a source of stored fluid under pressure, two cylinders in connection with said source, pistons in the cylinders, means operated by the pistons to move the flaps, the power supplied to the flap being sufficient to quickly bring it to operative position for emergency use, and box-like bracing means having apertures therein through which the means operated by the pistons extend.

2. In flap operating mechanisms for increasing the lift coefficient of the wings, the combination of a reservoir for compressed air, a single cylinder, opposed pistons in the cylinder, valve means to control the flow of air to the cylinder, flexible linkages connected to each of the opposed pistons to operate the wing flaps on opposite wings, the power supplied to the flap being sufficient to quickly bring it to the operative position for emergency use, and triangular box-like bracing means having apertures in the sides through which the flexible linkages at least in part extend.

3. In flap operating mechanisms for increasing the lift coefficient of the wings, the combination of a reservoir for compressed air, a single cylinder, opposed pistons in the cylinder, valve means to control the flow of air to the cylinder, flexible linkages connected to each of the opposed pistons to operate the wing flaps on opposite wings, manual means to compress the air in said cylinder, the power supplied to the flap being sufficient to quickly bring it to the operative position for emergency use, and triangular box-like bracing means having apertures in the sides through which the flexible linkages extend.

4. A flap operating mechanism for increasing the lift coefficient of the wings comprising a source of stored gas, cylinders in connection with said source, pistons in the cylinders, a plurality of flap operating stations, operating heads at each operating station, means linking the pistons and the operating heads to cause them to reciprocate, a bell crank lever at each operating station one arm of which is pivoted to the operating head for that station, means movable by the bell crank at each operating station to extend and retract the flap, valve means to control the direction of movement of the pistons in the cylinders to determine the direction of movement of the flaps, and a plurality of box-like bracing means having apertures in the sides through which the arms of each bell crank lever extend.

5. A flap operating mechanism for increasing the lift coefficient of the wings comprising a source of stored gas, cylinders in connection with said source, pistons in the cylinders, flexible linkage with said pistons to move the flaps, valve means to control the direction of movement of the pistons in the cylinders to determine the direction of movement of the flaps, the power supplied to the flap being sufficient to quickly bring it to the operative position for emergency use, and box-like bracing means through the sides of which the flexible linkages extend.

6. In a flap operating mechanism, a reservoir, a hand pump to compress fluid in said reservoir, motor means in connection with the reservoir, linkages operated by the motor means adapted to move the flaps, the power supplied to the flap being sufficient to quickly bring it to operative position for emergency use, and box-like bracing means through the sides of which the linkages extend.

EDWARD F. ZAPARKA.